(12) United States Patent
Murakami et al.

(10) Patent No.: US 8,384,935 B2
(45) Date of Patent: Feb. 26, 2013

(54) INFORMATION PROCESSING DEVICE FOR REPRODUCING CONTENTS INFORMATION

(75) Inventors: Masakazu Murakami, Itami (JP);
Atsushi Ohshima, Amagasaki (JP);
Masami Yamada, Sennan-gun (JP);
Tomonari Yoshimura, Kyoto (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 840 days.

(21) Appl. No.: 12/406,241

(22) Filed: Mar. 18, 2009

(65) Prior Publication Data

US 2009/0310170 A1    Dec. 17, 2009

(30) Foreign Application Priority Data

Jun. 11, 2008   (JP) ................................ 2008-153214

(51) Int. Cl.
*G06F 3/12* (2006.01)
(52) U.S. Cl. ....... 358/1.15; 358/3.23; 713/310; 713/323
(58) Field of Classification Search .......................... None
See application file for complete search history.

(56) References Cited

U.S. PATENT DOCUMENTS

| | | | |
|---|---|---|---|
| 7,447,457 B2 * | 11/2008 | Tose | 399/81 |
| 2007/0136293 A1 * | 6/2007 | Mizumukai | 707/9 |
| 2007/0182998 A1 * | 8/2007 | Okada | 358/400 |

FOREIGN PATENT DOCUMENTS

| | | |
|---|---|---|
| JP | 2004-222234 | 8/2004 |
| JP | 2004-318607 A | 11/2004 |
| JP | 2004318607 | * 11/2004 |
| JP | 2006-133998 | 5/2006 |
| JP | 2006-285346 A | 10/2006 |
| JP | 2007-088707 | 4/2007 |
| JP | 2007-150873 | 6/2007 |
| JP | 2007-249381 A | 9/2007 |

OTHER PUBLICATIONS

Notice of Grounds of Rejection issued in the corresponding Japanese Patent Application No. 2008-153214 dated May 11, 2010, and an English Translation thereof.

* cited by examiner

*Primary Examiner* — Marivelisse Santiago Cordero
*Assistant Examiner* — Aaron R Gerger
(74) *Attorney, Agent, or Firm* — Buchanan Ingersoll & Rooney PC

(57) ABSTRACT

An information processing device includes a plurality of modules for realizing a plurality of functions. The information processing device reproduces contents information and expects information which is to be inputted based on the functions relating to the reproduced contents information. Further, based on the expected information, the information processing device controls operations of at least some of the plurality of modules.

12 Claims, 11 Drawing Sheets

FIG.6

```
<html>
<head>
<title>FILE UPLOADING TEST</title>
<meta http-equiv="Content-Type" content="text/html"; charset="Shift_JIS" >
</head>
<body bgcolor="#FFFFFF" text="#000000" >
<h1>UPLOADING OF CONTRACT DOCUMENT</h1>
<form name="form1" method="post" action="./test.cgi" enctype="multipart/form-data" >         ---- D1
USER NAME: <input type="text" name="UserName" ></input>
<BR></BR>
Password: <input type="password" name="password" ></input>
<BR></BR>
CONTRACT DOCUMENT: <input type="file" name="fileName" size="60" ></input>         ---- D2
<BR></BR>
<input type="submit" name="submit" value="TRANSMISSION" ></input>         ---- D3
</form>
</body>
</html>
```

FIG.7

FILE (F)　EDIT (E)　DISPLAY (V)　FAVORITE (A)　TOOL (T)　HELP (H)

UPLOADING CONTRACT DOCUMENT

USER NAME:

Password:

CONTRACT DOCUMENT: REFER TO — V1

TRANSMIT — V2

PAGE IS DISPLAYED

FIG.8

```
<html>
<head>
<title>FILE UPLOADING TEST</title>
<meta http-equiv="Content-Type" content="text/html"; charset="Shift_JIS" >
<h1>BUSINESS-PURPOSE FORMAT LIST</h1>
<H4>IN CASE OF MFP, IF YOU SELECTS FILE, YOU WILL BE URGED TO SELECT PRINTING OR
DISPLAYING THUMBNAIL!</H4>
<a href="http://www.htmq.com/html/test1.pdf">BUSINESS-TRIP ACCOUNTING FORMAT</a><br>
<a href="http://www.htmq.com/html/test2.tiff">BUSINESS CONSIGNMENT DOCUMENT</a><br>
<a href="http://www.htmq.com/html/test3.jpg">PHOTOGRAPHS OF INSIDES OF ROOMS</a><br>
<a href="http://www.htmq.com/html/test5.jpg">PHOTOGRAPHS OF FACES OF EMPLOYEES</a><br>
<a href="http://www.htmq.com/html/test6.pdf">SEATING CHART</a><br>
</head>
<body bgcolor="#FFFFFF" text="#000000" >
</body>
</html>
```

(The block of `<a href=...>` lines is labeled D5.)

FIG.11

```
FILE (F)  EDIT (E)  DISPLAY (V)  FAVORITE (A)  TOOL (T)  HELP (H)
```

UPLOADING CONTRACT DOCUMENT

USER NAME: [        ]

Password: [        ]

CONTRACT DOCUMENT: [_____] [REFER TO] — V21

[TRANSMIT] — V22

PAGE IS DISPLAYED

INFORMATION PROCESSING DEVICE FOR REPRODUCING CONTENTS INFORMATION

This application is based on Japanese Patent Application No. 2008-153214 filed with the Japan Patent Office on Jun. 11, 2008, the entire content of which is hereby incorporated by reference.

BACKGROUND OF THE INVENTION

1. Field of the Invention

The present invention relates to an information processing device, a method for controlling an information processing device, and an information processing program. More particularly, the present invention relates to an information processing device that reproduces contents information structured to include a language file described in a markup language, a method for controlling the same, and a recording medium.

2. Description of the Related Art

Conventionally, there have been suggested various types of techniques for operating apparatuses which operate Web browsers, based on contents of files acquired from servers.

For example, Document 1 (Japanese Laid-Open Patent Publication No. 2004-318607) discloses a technique for, for a network terminal device such as a personal computer and a PDA (Personal Digital Assistant), associating tags included in HTML (HyperText Markup Language) files and the contents of data enclosed by tags with the contents of processing by the network terminal device and for causing this device to execute the contents of processing associated with tags and data corresponding to user's operations.

Further, Document 2 (Japanese Laid-Open Patent Publication No. 2006-285346) discloses a technique for, if an information processing device such as a personal computer acquires a certain HTML tag from HTML data acquired from a server, causing the information processing device to invalidate inputs, attachment and the like of data to web browsers.

Further, Document 3 (Japanese Laid-Open Patent Publication No. 2007-249381) discloses a technique for, if an information processing device used as a server is accessed by a browser, causing a Web application provided in this information processing device to determine whether or not the restoration from a power-saving state to a normal state should be performed, according to setting information acquired from a nonvolatile memory.

In the respective documents described above, there has been a need for making studies of information processing devices for operating web browsers, in view of improvement of the convenience of the devices for control of power supply and the like. Further, Document 3 can eliminate the necessity of techniques for controlling the electric power state such as releasing of a power-saving state, but it provides no description about concrete data management and the like and merely provides a technique relating to releasing of a power-saving state and the like in a server.

SUMMARY OF THE INVENTION

The present invention has been made in view of the above circumstances, and an object thereof is to improve convenience of an information processing device which operates web browsers and is operated by receiving web files such as HTML files.

An information processing device according to the present invention includes: a plurality of modules for realizing a plurality of functions; a reproduction unit to reproduce contents information structured to include a language file described in a predetermined markup language; a relation-information storage unit to store information which associates descriptions in the predetermined markup language with the functions; an analysis unit to perform analyses on the function relating to contents information to be reproduced by the reproduction unit, based on whether or not the contents information includes a description stored in the relation-information storage unit, an inputting unit to enable inputting information for realizing the function; an expectation unit to expect information to be inputted to the inputting unit, as a result of reproduction of contents information by the reproduction unit, based on the function analyzed by the analysis unit; and a control unit to control operations of at least some of the plurality of modules, based on the information expected by the expectation unit.

In accordance with the present invention, a method for controlling an information processing device including a plurality of modules for realizing a plurality of functions, includes the steps of: reproducing contents information structured to include a language file described in a predetermined markup language; storing information which associates descriptions in the predetermined markup language with the functions; determining whether or not the contents information to be reproduced includes a description stored in association with the functions; performing analyses on the function relating to the contents information to be reproduced, when the contents information to be reproduced is determined to include the description, expecting information to be inputted to the inputting unit, as a result of reproduction of the contents information to be reproduced, based on the analyzed function, and controlling operations of at least some of the plurality of modules, based on the expected information.

A computer-readable recording medium according to the present invention, which stores an information processing program for controlling an information processing device including a plurality of modules for realizing a plurality of functions, the information processing program is adapted to cause the information processing device to execute the steps of: reproducing contents information structured to include a language file described in a predetermined markup language; storing information which associates descriptions in the predetermined markup language with the functions; determining whether or not the contents information to be reproduced includes a description stored in association with the functions; performing analyses on the function relating to the contents information to be reproduced, when the content information to be reproduced is determined to include the description; expecting information which is to be inputted to the inputting unit, as a result of reproduction of the contents information to be reproduced, based on the analyzed function, and controlling operations of at least some of the plurality of modules based on the expected information.

According to the present invention, when contents information described in a predetermined markup language is reproduced, the functions relating to this contents information is analyzed, based on whether or not this contents information includes pre-stored descriptions.

Accordingly, with the information processing device which operates by receiving web files described in the predetermined markup language, before performing operations after receiving a web file, it is possible to expect the functions relating to the web file from analyses, which enables performing preliminary operations for the above-described to-be-performed operations.

Accordingly, this device can be caused to perform preliminary operations, which can improve the convenience of the device, such as reduction of the activation time for operations.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a view illustrating an example of HTML, data which the MFP in FIG. 1 receives from a server.

FIG. 7 is a view illustrating an exemplary screen page displayed on a display unit in FIG. 2, based on the HTML data illustrated in FIG. 6.

FIG. 8 is a view illustrating another example of HTML data which the MFP in FIG. 1 receives from the server.

FIG. 11 is a view illustrating another exemplary screen page displayed on the display unit in FIG. 2, based on the HTML data illustrated in FIG. 6.

DESCRIPTION OF THE PREFERRED EMBODIMENTS

With reference to the drawings, hereinafter described is an embodiment of an information processing device according to the present invention.

[1. Structure of Network]

Figure 1:
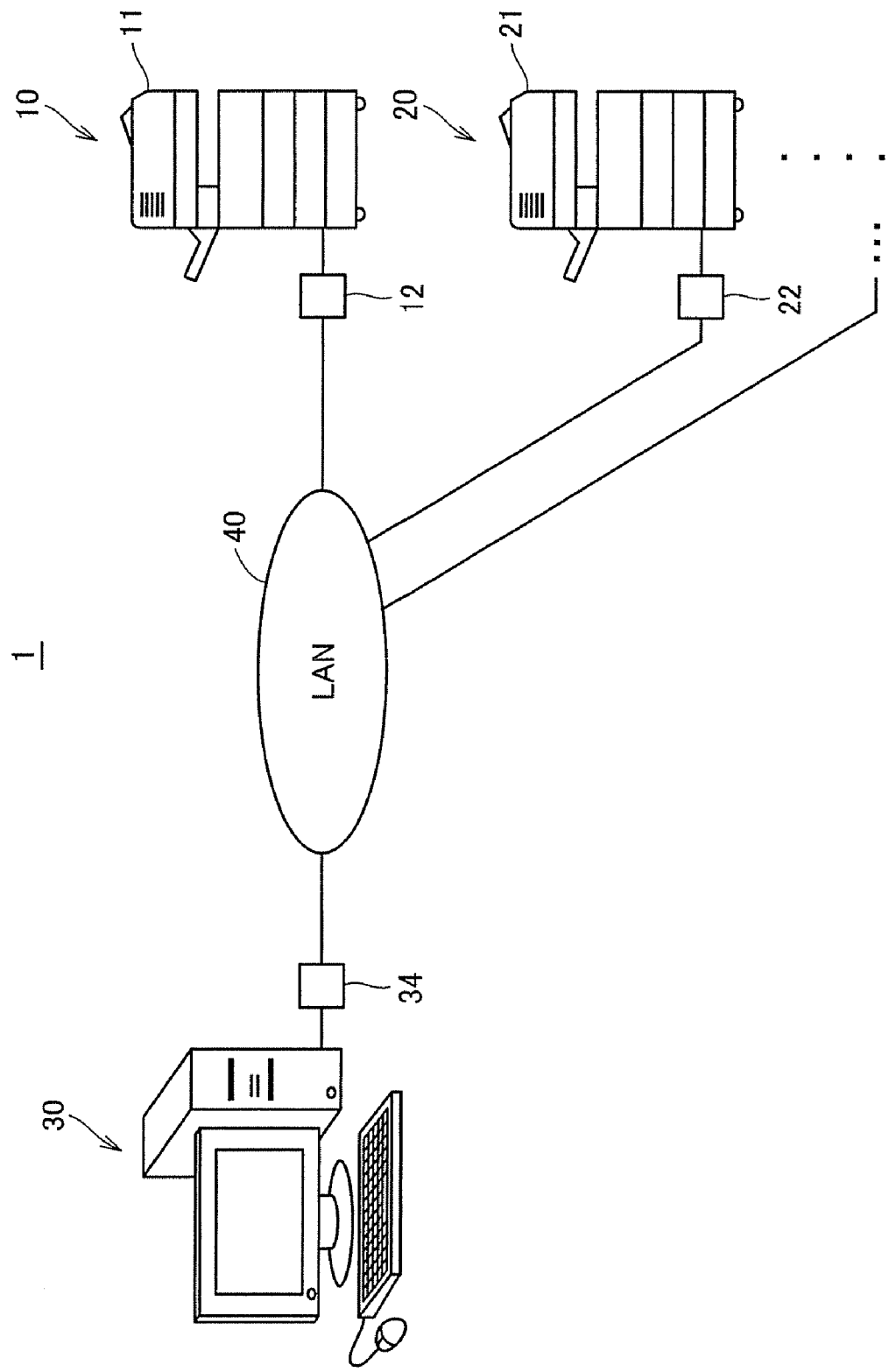
FIG. 1 is a view schematically illustrating a network structure including a first embodiment of an information processing device according to the present invention.

FIG. 1 is a view schematically illustrating the structure of a network including MFPs as an embodiment of the information processing device according to the present invention.

Referring to FIG. 1, this network 1 includes a server 30 and a plurality of MFPs. In FIG. 1, the respective MFPs 10 and 20 are connected to a LAN 40 through LAN (Local Area Network) cards 12 and 22.

Server 30 is constituted by, for example, a computer and includes structures included in a common server device, such as a storage unit which stores web contents which will be described later and programs for distributing web contents in response to requests from MFPs 10 and 20, and the like, and a processing unit which properly executes processing based on the programs and the like which are stored in this storage unit. Server 30 is connected to LAN 40 through a communication processing unit 34, so that it can perform data communication with a plurality of information processing devices including MFPs 10 and 20, through LAN 40.

[2. Structures of MFPs]

Figure 2:
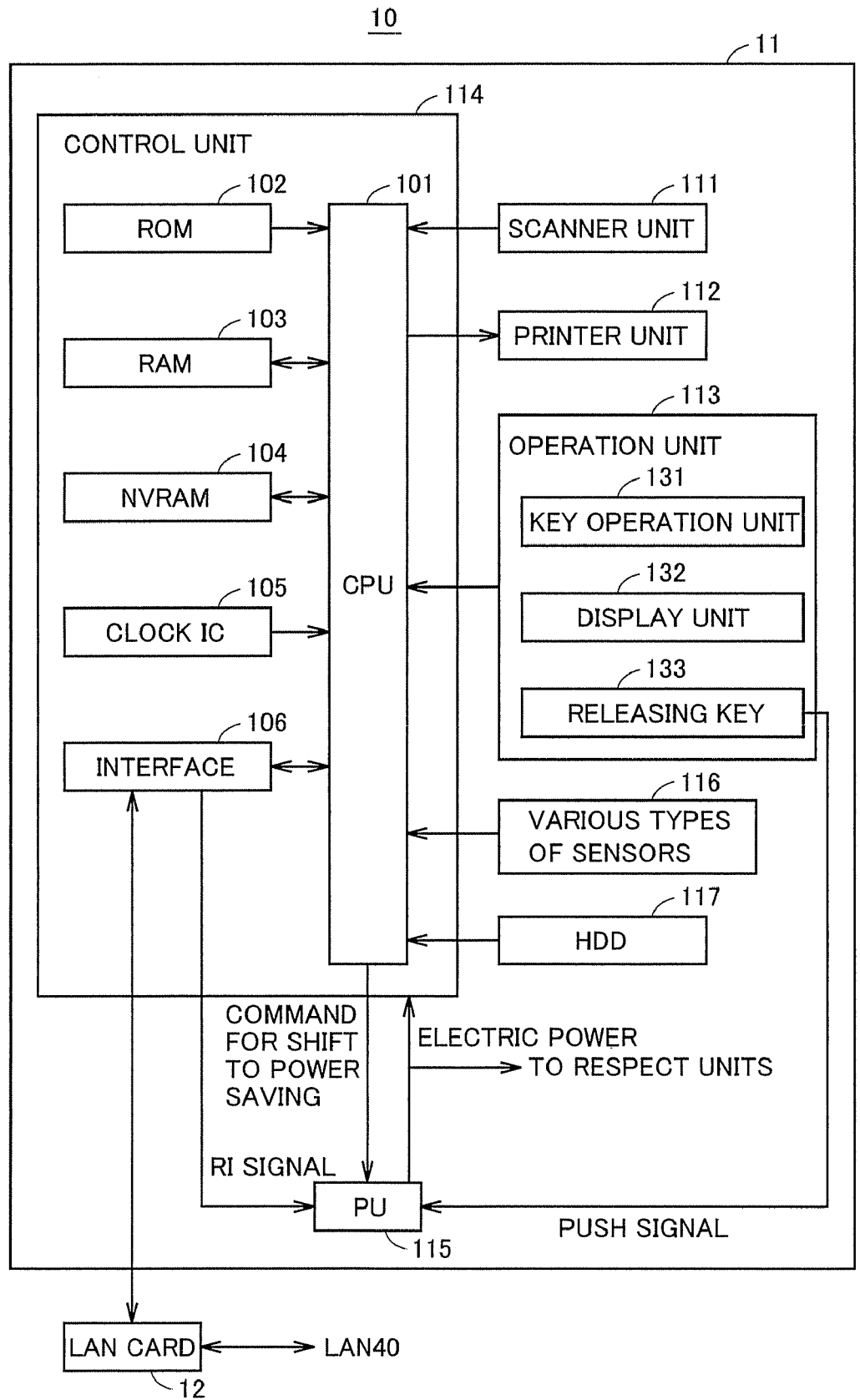
FIG. 2 is a view schematically illustrating functional blocks in MFPs (Multi Function Peripherals) in FIG. 1.

FIG. 2 is a block diagram illustrating the structure of MFP 10.

Referring to FIG. 2, an MFP main body 11 includes, as main components, a scanner unit 111, a printer unit 112, an operation unit 113, a control unit 114, a PU (Power Unit: power-supply device) 115, various types of sensors 116, and an HDD (Hard Disk Drive) 117.

Scanner unit 111 is a well-known document reading device which reads images in documents set at a proper position in MFP main body 11.

Printer unit 112 is a well-known printing device which performs printing on paper sheets, based on image data created by reading by scanner unit 111. More specifically, printer unit 112 includes photosensitive drums, a printing head, a developing device, a fixing device and the like and causes the printing head to generate laser light based on commands from a CPU (Central Processing Unit) 10 in control unit 114 for applying light exposure to the photosensitive drums which have been charged, thereby creating electrostatic latent images. Printer unit 112 develops the created latent images with toners in the developing device to form toner images, then transfers them to paper sheets transferred thereto and, then, heats and pressurizes the toner images transferred to the paper sheets with the fixing device including a heater to fix them to the paper sheets.

Operation unit 113 includes a key operation unit 131 including ten keys for receiving user's inputs of a number of copies and the like, a start key for receiving commands for start of copying, and the like. Further, operation unit 113 includes a display unit 132 which displays various types of information, such as the inputted number of copies. Display unit 132 is constituted by, for example, a liquid crystal display panel. Further, display unit 132 can be formed as a touch panel, which enables users to operate buttons displayed on this display unit 132.

Various types of sensors 116 include a jam detection sensor for detecting the presence or absence of the occurrence of jams of paper sheets being transferred, an electric-potential sensor for detecting the electric potentials of the charges on the photosensitive drums, a photoelectric sensor for detecting the amount of light exposure applied to the photosensitive drums with laser light, a toner detection sensor for detecting the amounts of residue toners in the developing device, and the like, and the data resulted from the detections by the respective sensors is transferred to control unit 114.

HDD 117 includes a hard disk. This hard disk stores various types of data, such as image data resulted from reading by scanner unit 111, a pickup table which will be described later, and the like.

Control unit 114 includes, as main components, CPU 101, a ROM (Read Only Memory) 102, a RAM (Random Access Memory) 103, an NVRAM (Non Volatile RAM) 104, a clock IC (Integrated Circuit) and a serial interface 106.

ROM 102 stores programs relating to document reading operations by scanner unit 111 and printing operations by printer unit 112, programs relating to processing for communication with server 30, and the like.

Clock IC 105 is a well-known IC for time measurement and is kept supplied with power supply from a backup battery which is not illustrated.

CPU 101 reads required programs from ROM 102 and performs overall control of printing operations and the like, while adjusting timings thereof, for realizing smooth copying operations. Further, CPU 101 performs processing for communicating with server 30. Further, CPU 101 detects troubles, such as jams, and also detects the amounts of residue toners and the like, based on detection data from various types of sensors 116. Further, CPU 101 stores, in NVRAM 104, various types of data, such as the number of copies and the count of jams. Further, CPU 101 displays the contents of occurred troubles and the like on display unit 132.

Further, if a state where no inputting operation and no copying operation and the like is performed is continued for a certain time. CPU 101 performs power saving processing for interrupting the supply of the electric power to the respective modules, such as itself (CPU 101), scanner unit 111, printer unit 112, to automatically shift to a power-saving mode in which the standby power consumption is saved.

More specifically, CPU 101 measures, using clock IC 105, the time of a state where no predetermined events such as inputting operations occur is continued. If the time reaches a predetermined time (hereinafter, referred to as a "power-saving shifting time"), CPU 101 generates, to PU 115, a command for interrupting the supply of electric power (a command for shifting to power saving).

Further, in the present embodiment, the modules are provided for realizing functions. Scanner unit 111 is a module for realizing the scanning function. Printer unit 112 is a module for realizing the printing function. HDD 117 is a module for realizing transmission of files stored in this HDD 117.

RAM 103 is a volatile memory which forms a work area during execution of programs by CPU 101.

NVRAM 104 is a nonvolatile memory which stores the IP (Internet Protocol) address of server 30, data indicative of the above-described power-saving shifting time, data about the current number of copies and the number of jams, and the like.

Serial interface 106, which is an interface for connecting CPU 101 to LAN card 12, receives data transmitted from server 30 through LAN card 12 and transmits it to CPU 101. Further, serial interface 106 transmits data from CPU 101 to server 301 through LAN card 12. Further, if serial interface 106 receives an RI (Ring Indicator signal from LAN card 12, as a signal-arrival detection signal, it transmits it to PU 115.

PU 115, which is connected to an external commercial power supply which is not illustrated, converts electric power from the commercial power supply into electric power required for operations and supplies it to the respective modules (scanner unit 111, printer unit 112, operation unit 113, control unit 114, HDD 117 and the like) in MFP main body 11.

Further, in the power-saving mode, PU 115 stops the supply of electric power to the other modules (CPU 101, scanner unit 111, printer unit 112, HDD 117 and the like) than a portion of operation unit 113 and serial interface 106.

Further, in the power-saving mode, if PU 115 receives an RI signal from serial interface 106 or a signal created by pushing of a releasing key 133 from operation unit 133, then it restarts the supply of electric power to the respective modules such as CPU 101 (release of the power saving). In that sense, RI signals also have the functions of signals indicative of commands for release of power saving. Further, releasing key 133 is a key provided in operation unit 113 in order to enable releasing of power saving.

LAN card 12 is a well-known device which connects control unit 114 to server 30 through LAN 40. In the present embodiment, LAN card 12 is structured to be supplied with electric power from the external commercial power supply, independently of MFP main body 11. Accordingly, LAN card 12 can detect arrivals of signals from the outside, even when MFP main body 11 is in the power-saving mode.

Figure 3:
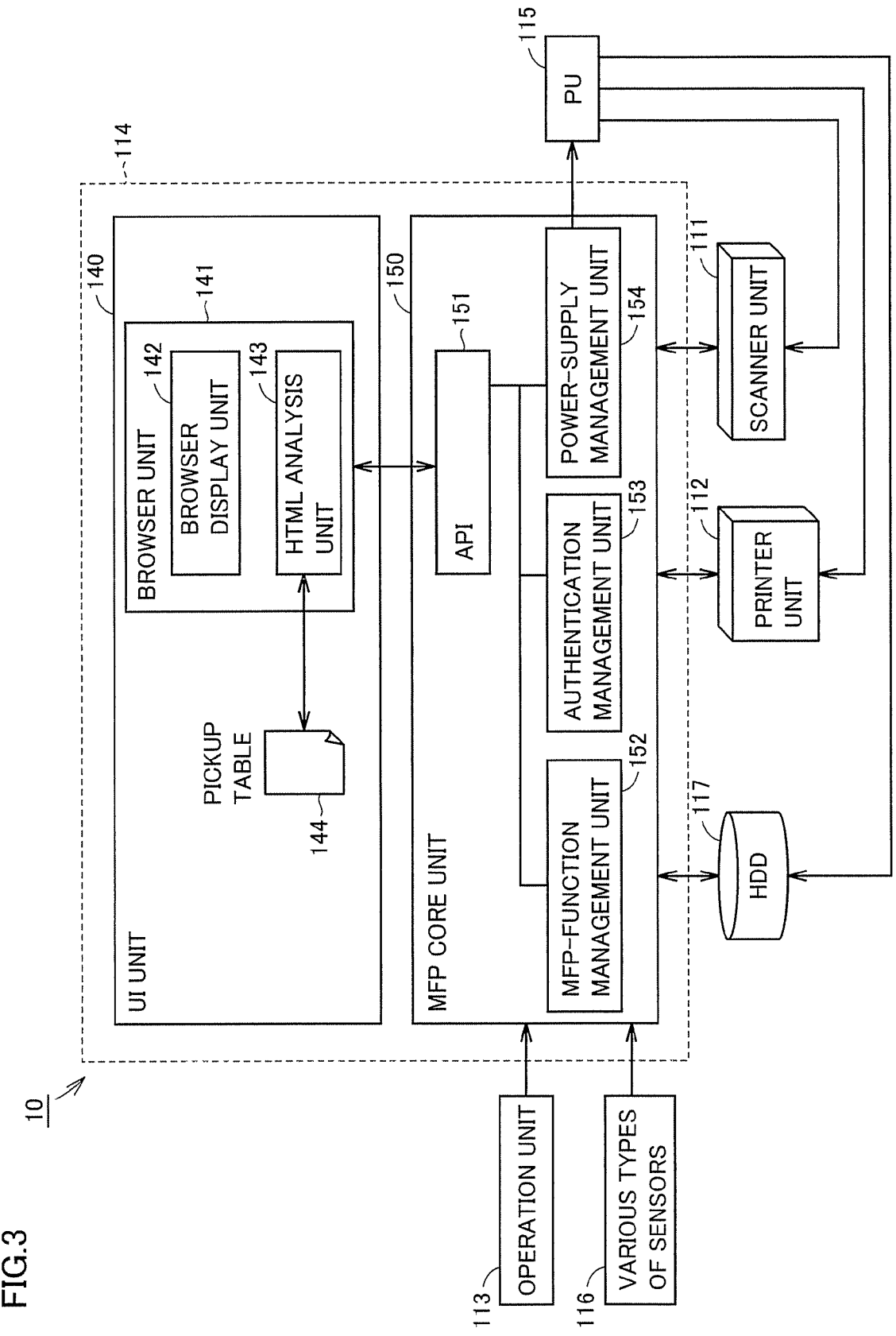
FIG. 3 is a control block diagram of the MFP in FIG. 1.

FIG. 3 is a control block diagram of MFP 10.

Referring to FIG. 3, control unit 114 includes an UI unit 140 which mainly performs control of the display on display unit 132, and an MFP core unit 150 which is caused to perform information processing operations such as creation of images in MFP 10, creation of files of scanned images, and the like.

UI unit 140 includes a browser unit 141 which functions as a web browser, and a browser unit 141. Browser unit 141 includes an HTML analysis unit 143 which performs analyses on HTML data transmitted from server 30, and a browser display unit 142 which controls the content of the display on display unit 132 based on the result of analyses by HTML analysis unit 143. HTML analysis unit 143 performs analyses on HTML data transmitted from server 30 to create pickup table 144 which will be described later.

MFP core unit 150 includes an API (Application Program Interface) unit 151 which stores various types of commands and the like for causing the respective components based on the above-described HTML data, such as HDD 117, printer unit 112 and scanner unit 111, to perform operations.

In MFP core unit 150, API unit 151 converts HTML data from server 30 into commands and the like which are to be outputted to the various types of components such as HDD 117, printer unit 112, scanner unit 111. An MFP-function management unit 152 manages the concrete contents of control for causing MFP 10 to exert the functions described in the above HTML data. An authentication management unit 153 manages authentication information for causing MFP 10 to execute allowed functions for each user. Further, MFP 10 is adapted such that users can use MFP 10 after they are authenticated by authentication management unit 153. Further, a user inputs a user name and a password to operation unit 113 and, if the combination of the user name and the password agrees with a combination pre-stored in authentication management unit 153, he or she is authenticated by authentication management unit 153. In the present specification, a state where the user has been authenticated by authentication management unit 153 refers to "the user is logging in", as required.

A power-supply management unit 154 controls the operations of PU 115 for supplying electric power to HDD 117, printer unit 112 and scanner unit 111.

The structure of MFP 20 is the same as that of MFP 10 which has been described above and will not be redundantly described in detail herein.

[3. Processing Executed by MFPs]
[3-1. Processing Executed by UI Unit]

Figure 4:
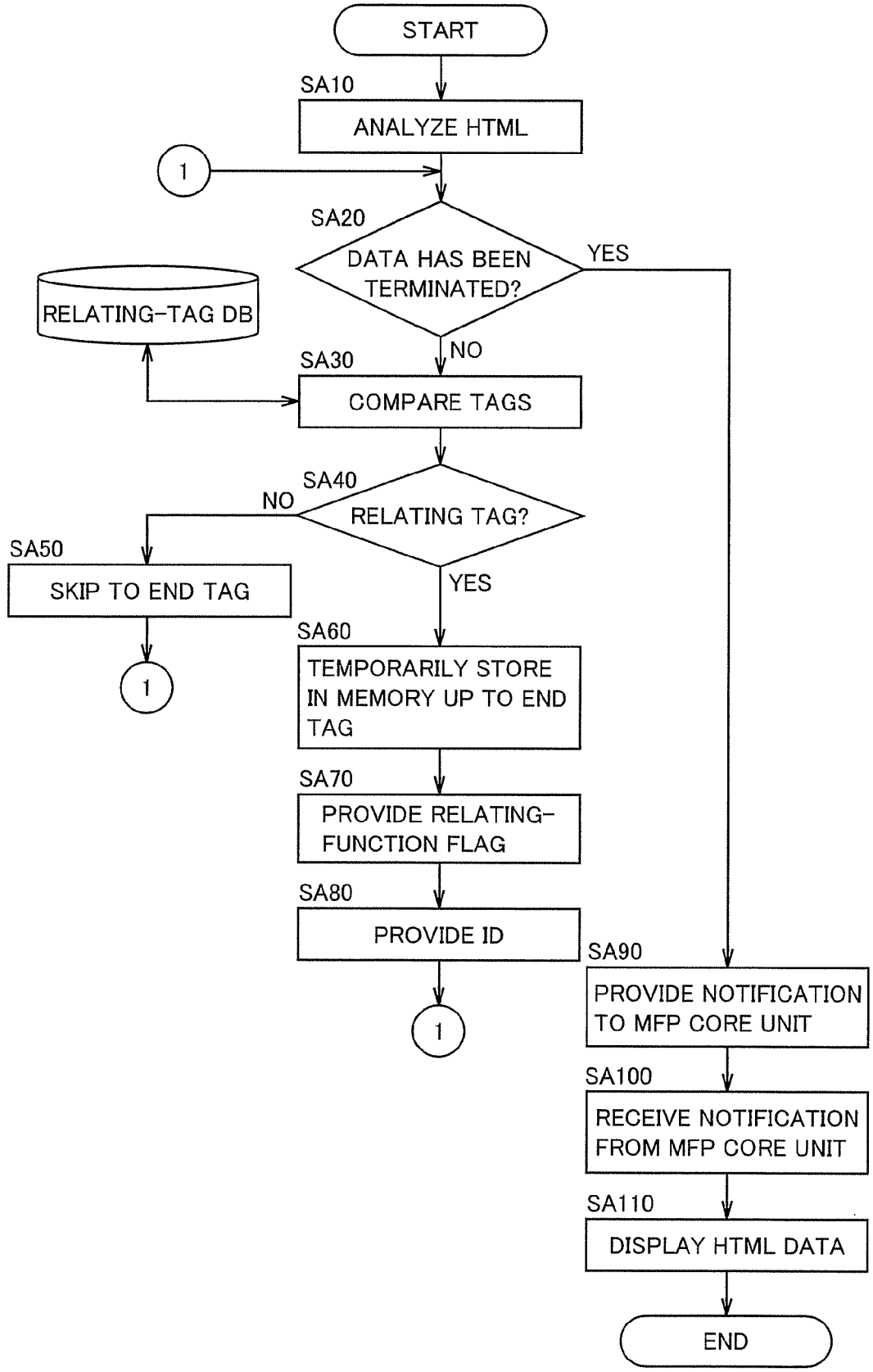
FIG. 4 is a flow chart of processing which is executed by an UI (User Interface) unit, when the MFP in FIG. 1 receives HTML data.

With reference to FIG. 4, there will be described processing which is executed by MFP 10 when it has received HTML data from server 30. Further, if MFP 10 receives HTML data, UI unit 140 first performs analyses on the HTML data and, then, executes creation of a pickup table which will be described later and the like based on the result of the analyses and, thereafter, MFP core unit 150 performs control of the hardware within MFP 10 based on the result of the analyses and the like. Then, hereinafter, the processing of MFP 10 which is performed when it receives HTML data will be described, in such a way that the processing is divided into the processing which is performed by UI unit 140 and the processing which is performed by MFP core unit 150.

First, the processing which is executed by UI unit 140 will be described, with reference to FIG. 4 illustrating a flow chart of this processing.

Referring to FIG. 4, if MFP 10 receives HTML data, first, in step SA10, HTML analysis unit 143 starts analyses on the syntax of the HTML data and, then, creates data to be displayed on display unit 132.

Next, in step SA20, HTML analysis unit 143 determines whether or not the received HTML data has been subjected to the processing in steps SA30 to SA80 which will be described, up to its end. Further, if HTML analysis unit 143 determines so, it carries forward the processing to step SA90.

If HTML analysis unit 143 determines that the HTML data has not been subjected to the processing up to its end, it carries forward the processing to step SA30.

In step SA30, HTML analysis unit 143 searches for a start tag in the received HTML data from its head until a start tag appears and, then, makes a comparison between the appeared tag and tags stored in a first relating-tag table.

In this case, the first relating-tag table is information included in a relating-tag database. HTML analysis unit 143 stores the above-described first relating-tag table and a second relating-tag table which will be described later, as a relating-tag database. Further, the relating-tag database is stored in ROM 104 and NVRAM 104 (see FIG. 2) in a hardware manner.

Table 1 illustrates an example of the content of the first relating-tag table.

TABLE 1

| FIRST RELATING-TAG TABLE | | |
|---|---|---|
| Tag | Attribute | Attribute value |
| <form> | method | "post" |
|  | enctype | "multipart/form-data" |

As illustrated in Table 1, the first relating-tag table represents an HTML tag (hereinafter, also referred to simply as a "tag"), in association with its attributes and attribute values.

More specifically, in Table 1, there are represented two attributes of {method} and {enctype} for a tag of {<form>}, and there are represented attribute values of {"post"} and {"multipart/form-data"} in association with the respective attributes. Namely, in the first relating-tag table illustrated in Table 1, there are represented two combinations of a tag, an attribute and an attribute value, which are combinations of {<form>)}, {method} and {"post"} and {<form>}, {enctype} and {"multipart/form-data"}.

Returning to FIG. 4, HTML analysis unit 143, which performs analyses on HTML data, determines whether or not the tag which has been subjected to the processing in step SA30 agrees with the tag illustrated in the first relating-tag table, in step SA40. If HTML analysis unit 143 determines that the tag is included therein, it carries forward the processing to step SA60. If HTML analysis unit 143 determines that the tag is not included therein, it carries forward the processing to step SA50.

In step SA50, the data to be processed is skipped up to the end tag corresponding to the tag which has been subjected to the comparison in step SA30 and, then, the processing is returned to step SA20.

On the other hand, in step SA60, HTML analysis unit 143 temporarily stores, in a memory (a pickup table which will be described later), the data from the tag subjected to the comparison in step SA30 to the appeared end tag corresponding to this tag, out of the HTML data, and, then, carries forward the processing to step SA70.

In step SA70, if the data extracted in step SA60 includes a structure having a combination of a tag, its attribute and its attribute value which is stored in the second relating-tag table, HTML analysis unit 143 associates the relating function associated therewith in the second relating-tag table with the extracted data and, then, carries forward the processing to step SA80. In this case, associating the relating function refers to adding a relating-function flag stored in association with the extracted data, to the pickup table including the extracted data. In this case, Table 2 illustrates an example of the second relating-tag table.

TABLE 2

| SECOND RELATING-TAG TABLE | | | |
|---|---|---|---|
| Tag | Attribute | Attribute value | Relating function |
| <input> | type | "file" | Scanning |
| <input> | type | "submit" |  |

As illustrated in Table 2, in the second relating-tag table, a relating function ("Scanning" in Table 2) is associated with combinations of a tag, its attribute and attribute value. More specifically, an attribute of {type} is represented in association with a tag of {<input>}, and attribute values of {"file"} and {"submit"} are represented in association therewith. Namely, in the second relating-tag table illustrated in Table 2, there are represented two combinations of a tag, an attribute and an attribute value, which are combinations of {<input>}, {type} and {"file"} and {<input>}, {type} and {"submit"}. Further, the function of "Scanning" is associated with both of the two combinations.

In step SA80, HTML analysis unit 143 provides a new ID to the combination of the data extracted in step SA60 and the relating-function flag added to this extracted data in step SA70 and, then, returns the processing to step SA20.

Hereinafter, the creation of the pickup table will be described, in more detail.

FIG. 6 illustrates an example of HTML, data which MFP 10 receives from server 30. Further, FIG. 7 illustrates an example of a screen page displayed on display unit 132, based on the HTML data illustrated in FIG. 6.

FIG. 7 illustrates a screen page for use in uploading image data of "Contract Document" from MFP 10 to server 30. In the screen page illustrated in FIG. 7, the image of the portion enclosed by a frame V1, namely the image of a component for inputting the storage portion for the image data to be uploaded, is displayed, in association with data enclosed by a frame D1 and data enclosed by a frame D2 in FIG. 6. Further, in the screen page illustrated in FIG. 7, the image of the portion enclosed by a frame V2, namely the image of a transmission button (a transmission button for transmitting, to server 30, the data stored in the portion inputted as the storage portion, in the portion enclosed by frame V1), is associated with data enclosed by a frame D3 in FIG. 6.

MFP 10 transmits image data stored in MFP 10 or image data created by scanning of images by scanner unit 111, as uploading of image data. Namely, uploading of image data may relate to operations of scanner unit 111 for completing the uploading. Based on this fact, if HTML analysis unit 143 receives, from server 30, HTML data for displaying a screen page for uploading image data, it determines, from analyses, that this HTML data relates to the scanning function. More specifically, the tags included in the data in frames D1 to D3, which are characteristic portions of the content of the display of the screen page for uploading data to server 30, out of the HTML data, are regarded as tags to be subjected to the determination as illustrated in Table 1 and Table 2. Further, a relating-function tag indicative of the scanning function is added to the HTML data including these characteristic portions, namely the HTML data including these tags.

Table 3 illustrates an example of the pickup table created by the processing in steps SA20 to SA80 which have been described above.

TABLE 3

PICKUP TABLE

| ID | Extracted data | Display area | Relating function |
|----|----------------|--------------|-------------------|
| 1 | <form name="form1"method="post"action="./test.cgi"enctype="multipart/form-data"><br>User name: <input type="text"name="UserName"></input><br><BR></BR><br>Password: <input type="password"name="password"></input><br><BR></BR><br>Contract document: <input type="file"name="fileName"size="60"></input><br><BR></BR><br><input type="submit"name="submit"value="send"></input><br></form> | X = 10, X = 45<br>Y = 10, Y = 40<br><br>X = 10, X = 50<br>Y = 50, Y = 80<br>X = 10,<br>X = 110<br>Y = 90,<br>Y = 130<br>X = 10, X = 15<br>Y = 140,<br>Y = 170 | Scanning |

As illustrated in Table 3, in the pickup table, there are stored the data extracted according to Table 1 and the relating-function tag added thereto according to Table 2, in association with an ID. In this case, "the extracted data" means the data extracted in step SA60 (a portion of the HTML data received by MFP 10), while "the relating function" means the type of the relating-function flag added thereto in step SA70. The ID is added thereto in step SA80.

Further, although not described above, HTML analysis unit 143 can calculate, from analyses on the HTML data, the coordinates at which the to-be-displayed objects based on the HTML data (the strings of characters in "Contract Document" in FIG. 7) are to be displayed and, then, can add the coordinates to the pickup table as "Display Areas", as illustrated in Table 3.

Returning to FIG. 4, assuming that the received HTML data has been processed up to its end, in step SA90, HTML analysis unit 143 transmits (notifies) the pickup table to MFP core unit 150 and, then, carries forwards the processing to step SA100.

In step SA100, HTML analysis unit 143 is on standby until it receives a notification from the MFP core unit. Then, on receiving it, HTML analysis unit 143 carries forward the processing to step SA110.

In step SA110, HTML, analysis unit 143 displays the received HTML data on display unit 132 as illustrated in FIG. 7 and ends the processing.

[3-2. Processing Executed by MFP Core Unit]

Figure 5:
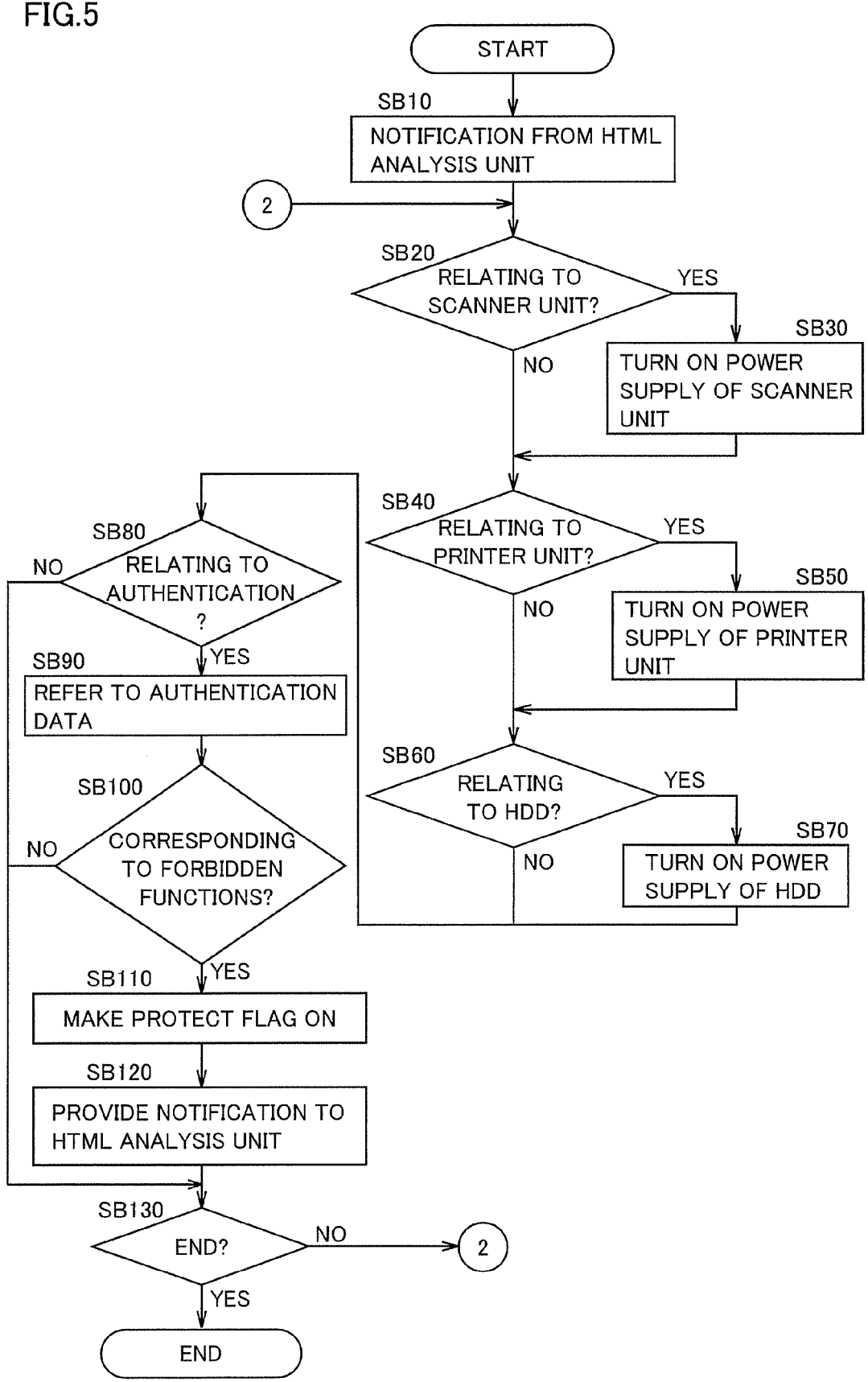
FIG. 5 is a flow chart of processing which is executed by an MFP core unit, when the MFP in FIG. 1 receives HTML data.

With reference to FIG. 5, there will be described the processing which is executed by MFP core unit 150 if MFP core unit 150 receives a notification of a pickup table from HTML analysis unit 143 in step SA90.

If MFP core unit 150 receives a notification of a pickup table from HTML analysis unit 143, MFP core unit 150 first accepts this notification in step SB10.

Next, in step SB20, MFP core unit 150 determines whether or not the data included in the pickup table given through the received notification relates to operations of scanner unit 111. If MFP core unit 150 determines that it relates thereto, it carries forward the processing to step SB30. If MFP core unit 150 determines that it does not relate thereto, it carries forward the processing to step SB40.

In this case, the determination as to whether the data included in the pickup table relates to operations of scanner unit 111 is made, based on the relating-function flag included in the pickup table. More specifically, the determination is made by making a reference to a module correspondence table which associates relating-function flags with corresponding modules in MFP 10, as illustrated in Table 4. Further, the module correspondence table is stored in, for example, ROM 102.

TABLE 4

MODULE CORRESPONDENCE TABLE

| Relating function | Module |
|-------------------|--------|
| Scanning | Scanner unit |
| Printing | Printer unit |
| : | : |

As can be seen from Table 4, the module correspondence table associates relating functions (relating-function flags) with modules such as scanner unit 111, printer unit 112 and the like in MFP 10. Then, in step SB20, it is determined whether or not the module corresponding to the relating-function flag included in the pickup table given through the notification from HTML analysis unit 143 is scanner unit 111, based on the module correspondence table.

Returning to FIG. 5, in step SB30, MFP core unit 150 causes PU 115 to start the supply of electric power to scanner unit 111 and, then, carries forward the processing to step SB40. Accordingly, even in the power-saving mode, it is possible to start the supply of electric power to only scanner unit 111, independently of printer unit 112 and HDD 117.

In step SB40, MFP core unit 150 determines whether or not the data included in the pickup table given through the received notification relates to operations of printer unit 112. Further, the determination is made, based on the relating-function flag included in the pickup table, by making a reference to the above-described module correspondence table. Further, if it is determined that the data relates to operations of printer unit 112, the processing is carried forward to step SB50. If it is determined that the data does not relate thereto, the processing is carried forward to step SB60.

In step SB50, MFP core unit 150 causes PU 115 to start the supply of electric power to printer unit 112 and, then, carries forward the processing to step SB60. Accordingly, even in the power-saving mode, it is possible to start the supply of electric power to only printer unit 112, independently of scanner unit 111 and HDD 117.

In step SB60, MFP core unit 150 determines whether or not the data included in the pickup table given through the received notification relates to operations of HDD 117. Further, the determination is made, based on the relating-function flag included in the pickup table, by making a reference to the above-described module correspondence table. Further, if it is determined that the data relates to operations of HDD 117, the processing is carried forward to step SB70. If it is determined that the data does not relate thereto, the processing is carried forward to step SB80.

In step SB70, MFP core unit 150 causes PU 115 to start the supply of electric power to HDD 117 and, then, carries forward the processing to step SB80. Accordingly, even in the power-saving mode, it is possible to start the supply of electric power to only HDD 117, independently of scanner unit 111 and printer unit 112.

In step SB80, it is determined whether or not the pickup table given through the notification received from HTML analysis unit 143 includes a relating-function flag relating to authentication. Further, it is assumed that, in MFP 10, only the relating-function flag "Printing" is a relating-function flag relating to authentication, and the relating-function flag "Scanning" is not a relating-function flag relating to authentication. Further, it is assumed that information indicative of whether or not relating-function flags relate to authentication is stored in ROM 102, for example. Further, if it is determined in step SB80 that the pickup table includes a relating-function flag relating to authentication, the processing is carried forward to step SB90. If it is determined that the pickup table does not include it, the processing is carried forward to step SB130.

In step SB90, a reference is made to authentication data for the user being logging in.

Then, in step SB100, it is determined whether or not the relating-function flag included in the pickup table given through the notification received from HTML analysis unit 143 corresponds to a function forbidden for the user being logging in. Then, if it is determined that the relating-function flag corresponds to a forbidden function, the processing is carried forward to step SB110 If it is determined that the relating-function flag does not correspond to a forbidden function, the processing is carried forward to step SB130.

In step SB110, the pickup table given through the notification received from HTML analysis unit 143 is updated in order to make a protect flag ON and, then, the processing is carried forward to step SB120. The protect flag will be described later.

In step SB120, the updated pickup table is notified (transmitted) to HTML analysis unit 143 and, then, the processing is carried forward to step SB130. In response thereto, HTML analysis unit 143 receives the pickup table in step SA100.

In step SB130, it is determined whether or not all the data in the pickup table given through the notification from HTML analysis unit 143 has been subjected to steps SB20 to SB120 and, if there still is data which has not been subjected thereto, the processing is returned to step SB20. If it is determined that all of the data has been subjected thereto, the processing ends.

[4. About Relating-Function Flag Relating to Authentication]

Figure 9:
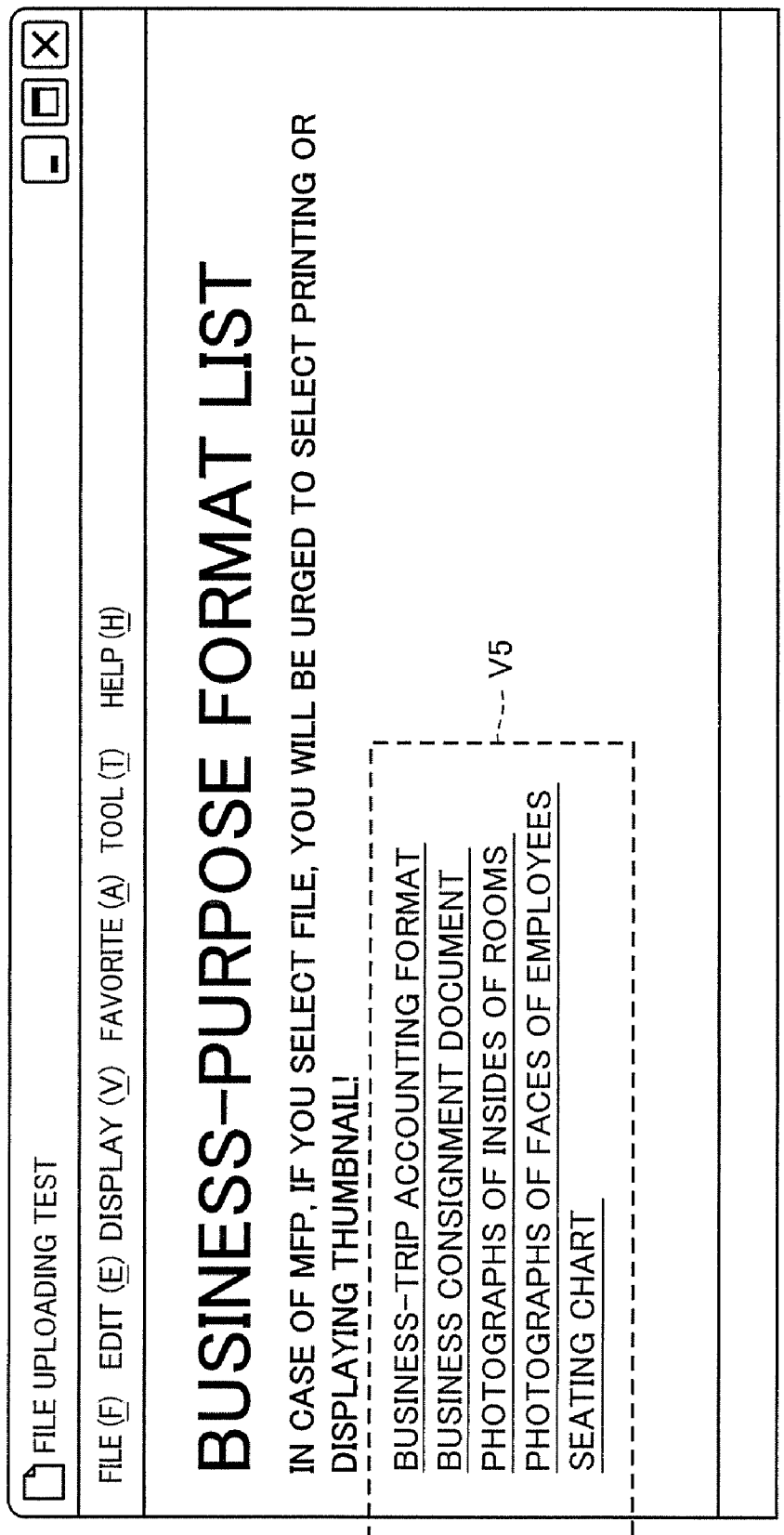
FIGS. 9 and 10 are views illustrating exemplary screen pages displayed on the display unit in FIG. 2, based on the HTML data illustrated in FIG. 8.

FIG. 8 illustrates another example of HTML data transmitted from server 30 to MFP 10. Further, FIG. 9 illustrates an example of a screen page displayed on display unit 132, based on the HTML data illustrated in FIG. 8.

The portion corresponding to data D5 in FIG. 8 corresponds to the display of the strings of characters describing "Business-Trip Accounting Format", "Business Consignment Document", "Photographs of Inside of Rooms", "Photographs of Faces of Employees" and "Seating Chart", which is illustrated in a frame V5 in FIG. 5, wherein these strings of characters are linked to image data stored in another apparatus in LAN 40.

When the processing illustrated in FIG. 4 is executed on HTML data as illustrated in FIG. 8, a relating-tag table as illustrated in Table 6 can be employed, instead of the first relating-tag table and the second relating-tag table (see Tables 1 and 2).

TABLE 5

RELATING-TAG TABLE

| Tag | Attribute | Attribute value | Relating function |
|---|---|---|---|
| <a> | href | Including .pdf | Printing/Displaying thumbnail |
| <a> | href | Including .tiff | Printing/Displaying thumbnail |
| <a> | href | Including .jpg | Printing/Displaying thumbnail |

More specifically, Table 5 includes a tag of {<a>}, as a tag. Further, when such a table is employed, as illustrated in Table 5, the data from each tag {<a>} to the end tag {</a>} corresponding thereto is extracted from the data illustrated in FIG. 8 and is added to the pickup table, in such a way as to add a single ID to this data.

TABLE 6

PICKUP TABLE

| ID | Extracted data | Display area | Relating function |
|---|---|---|---|
| 1 | <a href="http://www.htmq.com/html/test1.pdf">Business-Trip Accounting Format </a> | X = 10, X = 40<br>Y = 10, Y = 30 | Printing<br>Displaying thumbnail |
| 2 | <a href="http://www.htmq.com/html/test2.tiff">Business Consignment Document </a> | X = 10, X = 40<br>Y = 40, Y = 60 | Printing<br>Displaying thumbnail |
| 3 | <a href="http://www.htmq.com/html/test3.jpg">Photographs of Insides of Rooms </a> | X = 10, X = 40<br>Y = 70, Y = 90 | Printing<br>Displaying thumbnail |
| 4 | <a href="http://www.htmq.com/html/test5.jpg">Photographs of Faces of Employees </a> | X = 10, X = 40<br>Y = 100, Y = 120 | Printing<br>Displaying thumbnail |
| 5 | <a href="http://www.htmq.com/html/test6.pdf">Seating Chart </a> | X = 10, X = 40<br>Y = 130, Y = 150 | Printing<br>Displaying thumbnail |

Further, the relating-tag table illustrated in Table 5 represents the functions of "Printing" and "Displaying Thumbnail", in the fields of respective relating functions and, therefore, the functions of "Printing" and "Displaying Thumbnail" are also added to the pickup table, as relating functions corresponding to the respective IDs.

Then, the pickup table created as described above is notified (transmitted) to MFP core unit 150.

Since the pickup table as illustrated in Table 6 is transmitted to MFP core unit 150, MFP core unit 150 starts the supply of electric power to printer unit 112, in step SB50.

Then, in step SB80, as described above, it is determined whether or not the pickup table given through the notification received from HTML analysis unit 143 includes a relating-function flag relating to authentication. Since the pickup table illustrated in Table 6 includes "Printing" as a relating function, if this table to be processed, the processing is carried forward to step SB90.

In step SB90, a reference is made to the authentication data for the user being logging in. Table 7 illustrates an example of the authentication data to be referred for.

TABLE 7

AUTHENTICATION INFORMATION TABLE

| User name | Authentication information |
|---|---|
| A | No restriction |
| B | Printing is disabled |
| C | No restriction |
| : | : |

Table 7 stores, for each user, the presence or absence of a function which is forbidden to be operated and the type of this function, as "authentication information". More specifically, Table 7 indicates authentication information on three users having user names of A, B and C. Among them, the user name B is stored in association with information indicating the fact that the function of "Printing" is forbidden to be realized ("Disabled" in Table 7).

Then, in step SB100, it is determined whether or not the relating-function flag included in the pickup table given through the notification received from HTML analysis unit 143 corresponds to a function forbidden for the user being logging in. For example, in a case where the user being currently logging in is the user having the user name B, since the pickup table in Table 6 includes "Printer" as a relating-function flag, it is determined that "the relating-function flag corresponds to a function forbidden for the user being logging in". Thus, the processing is carried forward to step SB110.

In step SB110, the pickup table given through the notification from HTML analysis unit 143 is updated, in order to make the protect flag ON and, then, the processing is carried forward to step SB120.

Thus, the pickup table illustrated in Table 6 is updated to that illustrated in Table 8.

In step SB120, the updated pick-up table is notified (transmitted) to HTML analysis unit 143 and, then, the processing is carried forward to step SB130. In response thereto, HTML analysis unit 143 receives the pickup table in step SA100.

In this case, referring to FIG. 4, HTML analysis unit 143 receives the pickup table in step SA100 and displays the HTML data in step SA110.

In displaying the HTML data in step SA110, information on the protect flag in the updated pickup table received from MFP core unit 150 is reflected thereon.

Namely, browser display unit 142 displays the extracted data for which the protect flag is ON in the updated pickup table, in such a way as to indicate that the user being logging in cannot use the function of MFP 10 corresponding to this display.

Figure 10:
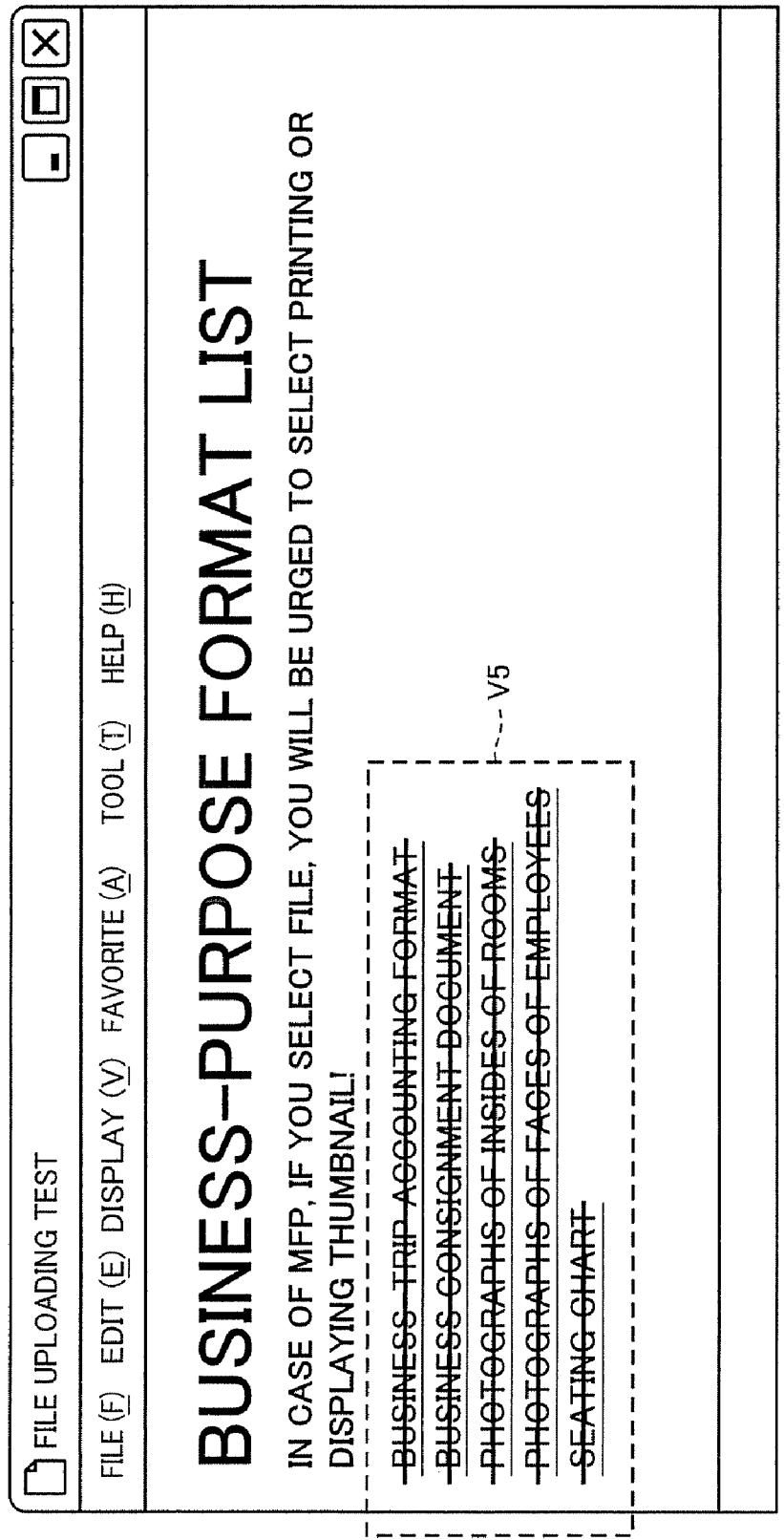

FIG. 10 illustrates an example of the way of displaying.

In FIG. 10, the content of the screen page illustrated in FIG. 9 which corresponds to the extracted data for which the protect flag is ON in the updated pickup table illustrated in Table 8 is displayed by being provided with canceling lines, as represented in a frame V5.

Also, browser display unit 142 can search for portions having the same data as the extracted data having the IDs for which the protect flag is ON in the updated pickup table, in the original HTML data, and can execute processing for changing the way of displaying of these portions to create data for use in realizing display as illustrated in FIG. 10. Also, browser display unit 143 can execute processing for adding, to the original HTML data, images of the canceling lines as decorations at the positions corresponding to "Display Areas" for the IDs for which the protect flag is ON in the updated pickup table, in order to create data for use in realizing display as illustrated in FIG. 10.

In the present embodiment, information which assists inputting, to operation unit 113, information indicative of a command for uploading data or displaying image data in LAN 40 is created, using the image of the portion enclosed by frame V1 in FIG. 7, namely the image of the component for inputting the storage portion for the image data to be uploaded, or the strings of characters describing "Business-Trip Accounting Format", "Business Consignment Document", "Photographs of Insides of Rooms", "Photographs of Faces of Employees" and "Seating Chart" illustrated in frame V5 in FIG. 9 which are linked to image data stored in another apparatus in LAN 40. The user can perform operations relating to the image in frame V1 or the strings of characters in frame V5, through operation unit 113 in MFP 10, to cause MFP 10 to realize the function of uploading files to server 30 or displaying and printing image data in LAN 40.

TABLE 8

PICKUP TABLE

| ID | Extracted data | Display area | Relating function | Protect flag |
|---|---|---|---|---|
| 1 | <a href="http://www.htmq.com/html/test1.pdf">Business-Trip Accounting Format </a> | X = 10, X = 40<br>Y = 10, Y = 30 | Printing<br>Displaying thumbnail | ON |
| 2 | <a href="http://www.htmq.com/html/test2.tiff">Business Consignment Document </a> | X = 10, X = 40<br>Y = 40, Y = 60 | Printing<br>Displaying thumbnail | ON |
| 3 | <a href="http://www.htmq.com/html/test3.jpg">Photographs of Insides of Rooms </a> | X = 10, X = 40<br>Y = 70, Y = 90 | Printing<br>Displaying thumbnail | ON |
| 4 | <a href="http://www.htmq.com/html/test5.jpg">Photographs of Faces of Employees </a> | X = 10, X = 40<br>Y = 100, Y = 120 | Printing<br>Displaying thumbnail | ON |
| 5 | <a href="http://www.htmq.com/html/test6.pdf">Seating Chart </a> | X = 10, X = 40<br>Y = 130, Y = 150 | Printing<br>Displaying thumbnail | ON |

Further, the way of indicating that the user being logging in cannot use the function is not limited to that which uses canceling lines as illustrated in FIG. 10.

For example, FIG. 11 illustrates an example of a screen page which employs a different way of indicating that the user being logging in cannot use the images in frame V1 and the frame V2 in FIG. 7. In FIG. 11, frames V21 and V22 corresponding to frames V1 and V2 in FIG. 7 are displayed in a grayout manner.

In the present embodiment which has been described above, in a case where HTML data includes a tag which agrees with a tag in the first relating-tag table (see Table 1) or the relating-tag table (Table 5) in step SA40, the data from this tag to the end tag corresponding thereto is extracted therefrom and is added to the pickup table, and an ID is added thereto. Then, a relating-function tag is provided for each ID.

Then, based on the relating-function flag, in steps SB20 to SB70, the supply of electric power to scanner unit 111, printer unit 112 and/or HDD 117 is started. In this case, based on the relating-function flags which have been provided for the IDs, the HTML data received by WFP 10 is displayed, so that the function which will be commanded to be executed by the user (for example, uploading of a file through scanning) is expected, and the supply of electric power to the module which realizes the expected function (for example, scanner unit 111) is started. Accordingly, when display unit 32 has been caused to perform display based on the HTML data, if information indicative of a command for realization of the function using scanner unit 111 (uploading of a file through scanning) is inputted to operation unit 113, MFP 10 has already started the supply of electric power to only scanner unit 111, even when it has been putted into the power-saving mode by then. This can shorten the time interval from the inputting of this command to the activation of scanner unit 111, thereby shortening the waiting time of the user, in comparison with cases where the supply of electric power is started in response to the input of a command to operation unit 113.

Further, in the present embodiment which has been described above, it is expected that the user will perform operations for generating a command for realization of the function which is forbidden to be realized for the user, based on the relating-function flag. Further, display unit 132, which is a displaying module, is controlled in operation, such that it performs display as illustrated in FIG. 10 and FIG. 11, in order to prevent these operations from being performed.

Namely, if MFP 10 receives HTML data from server 30, in a case where an image which enables the user to input a command for operations for realizing a function is displayed for the user, in a case where this function is forbidden to be realized for the user, this image for use in operations is displayed in such a way as to indicate that the realization of this function is forbidden. For example, in a case where the user being logging in is forbidden to perform printing, the respective menus in frame V5 which are displayed as objects to be printed are displayed by being provided with canceling lines.

Further, in the present embodiment which has been described above, the programs of the executed processing can be either recorded in a recording medium fixed to MFP 10 or recorded in a recording medium which is detachable to MFP 10. Further, the programs can be either preliminarily installed in MFP 10 or downloaded to MFP 10 through a network such as LAN 40 and installed therein.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing device comprising:
a plurality of modules executing a plurality of functions;
a reproduction unit reproducing contents information, which includes a language file described in a predetermined markup language;
a relation-information storage unit storing information that associates descriptions in said predetermined markup language with respective functions;
an analysis unit analyzing, if said contents information includes a description stored in said relation-information storage unit, a function relating to contents information to be reproduced by said reproduction unit;
an inputting unit inputting information for executing the function;
an expectation unit expecting information regarding the execution of the function to be inputted to said inputting unit, based on the reproduction of contents information and the analyzed function;
an electric-power supply unit controlling supply of electric power to said plurality of modules, such that electric power to a module configured to execute the analyzed function is turned on based on the stored and expected information; and
a control unit to control operations of at least some of said plurality of modules, based on the expected information.

2. The information processing device according to claim 1, wherein
said plurality of modules include a scanner unit to read an image to create a file,
said relation-information storage unit stores a description for displaying an image to be operated for generating a command for transmission of a file to another apparatus, in association with the function of reading an image and creating a file,
said expectation unit expects that information for driving said scanner unit for reading an image and creating a file will be inputted, as a result of reproduction of contents information by said reproduction unit, and
said control unit causes said electric-power supply unit to start supply of electric power to said scanner unit.

3. The information processing device according to claim 1, further comprising:
an authentication unit to perform user authentication; and
a user-information storage unit to store, for each user, information on a function forbidden to be realized, wherein
said reproduction unit reproduces contents information to cause a display unit to display information which assists inputting information to said inputting unit, and
when contents information reproduced by said reproduction unit includes a description for displaying forbidden-function assist information which assists inputting, to said inputting unit information indicative of a command for realizing a function forbidden for the user who has been authenticated by said authentication unit, based on the information stored in said user-information storage unit, said control unit causes said reproduction unit to display said forbidden-function assist information in such a way as to indicate that the corresponding function cannot be realized.

4. The information processing device according to claim 3, wherein
said control unit causes said reproduction unit to display said forbidden-function assist information in such a way as to add a decoration to an object to be displayed according to the descriptions in the contents information reproduced by said reproduction unit.

5. A method for controlling an information processing device including a plurality of modules for executing a plurality of functions, comprising the steps of:
   reproducing contents information structured to include a language file described in a predetermined markup language;
   storing information associating descriptions in said predetermined markup language with respective functions;
   determining if said contents information to be reproduced includes a description that is stored in association with a respective function;
   when said contents information to be reproduced is determined to include said description, performing analyses on the respective function relating to said contents information to be reproduced;
   expecting information regarding the execution of the respective function to be inputted, as a result of reproduction of said contents information to be reproduced and based on said analyzed function;
   starting supply of electric power to a module, configured to execute the analyzed function, based on the stored and expected information; and
   controlling operations of at least some of said plurality of modules, based on said expected information.

6. The method for controlling an information processing device according to claim 5, further comprising the step of:
   starting supply of electric power to said scanner unit, when information for operating the scanner unit in said information processing device for reading an image and creating a file is expected to be inputted, as a result of reproduction of contents information.

7. The method for controlling an information processing device according to claim 5, further comprising the steps of
   performing user authentication, and
   storing, for each user, information on a function forbidden to be realized, wherein
   said contents information to be reproduced is reproduced to cause a display unit to display information which assists inputting information for realizing a function, and
   when said information which assists inputting information includes forbidden-function assist information which assists inputting information on the function forbidden for said authenticated user, said forbidden-function assist information is displayed in such a way as to indicate that the corresponding function cannot be realized.

8. The method for controlling an information processing device according to claim 7, wherein
   said forbidden-function assist information is displayed, in such a way as to add a decoration to an object to be displayed according to the descriptions in said reproduced contents information.

9. A non-transitory computer-readable recording medium which stores an information processing program for controlling an information processing device including a plurality of modules for realizing a plurality of functions, said information processing program being adapted to cause said information processing device to execute the steps of:
   reproducing contents information structured to include a language file described in a predetermined markup language;
   storing information associating descriptions in said predetermined markup language with respective functions;
   determining if said contents information to be reproduced includes a description that is stored in association with a respective function;
   when said contents information to be reproduced is determined to include said description, performing analyses on the respective function relating to said contents information to be reproduced;
   expecting information regarding the execution of the respective function to be inputted, as a result of reproduction of said contents information to be reproduced and based on said analyzed function;
   starting supply of electric power to a module, configured to execute the analyzed function, based on the stored and expected information; and
   controlling operations of at least some of said plurality of modules, based on said expected information.

10. The non-transitory recording medium according to claim 9, wherein said information processing program is adapted to cause said information processing device to further execute the step of starting supply of electric power to a scanner unit in said information processing device, when information for driving said scanner unit for reading an image and creating a file is expected to be inputted, as a result of reproduction of contents information.

11. The non-transitory recording medium according to claim 9, wherein said information processing program is adapted to cause said information processing device to further execute the steps of
   performing user authentication, and
   storing, for each user, information on a function forbidden to be realized, in which
   said information processing program further causes said information processing device to reproduce said contents information to be reproduced for causing a display unit to display information which assists inputting information for realizing a function, and
   when said information which assists inputting information includes forbidden-function assist information which assists inputting information on the function forbidden for said authenticated user, said information processing program causes said information processing device to display said forbidden-function assist information in such a way as to indicate that the corresponding functions cannot be realized.

12. The non-transitory recording medium according to claim 11, wherein said information processing program is adapted to cause said information processing device to display said forbidden-function assist information in such a way as to add a decoration to an object to be displayed according to the descriptions in said reproduced contents information.

* * * * *